(12) United States Patent
Leslie et al.

(10) Patent No.: US 11,107,016 B2
(45) Date of Patent: Aug. 31, 2021

(54) AUGMENTED POWER CONTROL WITHIN A DATACENTER USING PREDICTIVE MODELING

(71) Applicant: Virtual Power Systems, Inc., Milpitas, CA (US)

(72) Inventors: Martin P Leslie, San Jose, CA (US); Karimulla Raja Shaikh, Cupertino, CA (US); Nikhil Sharma, El Dorado Hills, CA (US); Ravi Subramaniam, San Jose, CA (US); Dhanaraja Kasinathan, San Jose, CA (US); Shankar Ramamurthy, Saratoga, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 0 days.

(21) Appl. No.: 15/829,235

(22) Filed: Dec. 1, 2017

(65) Prior Publication Data

US 2018/0082224 A1    Mar. 22, 2018

Related U.S. Application Data

(63) Continuation of application No. 15/680,286, filed on Aug. 18, 2017.

(Continued)

(51) Int. Cl.
*G06F 1/26* (2006.01)
*H02J 3/14* (2006.01)
(Continued)

(52) U.S. Cl.
CPC .............. *G06Q 10/06* (2013.01); *G06F 1/26* (2013.01); *G06F 9/4893* (2013.01); *G06F 9/50* (2013.01);
(Continued)

(58) Field of Classification Search
CPC ......... G06Q 10/06; G06F 1/26; G06F 9/4893; G06F 9/50; G06F 19/00; H02J 3/006;
(Continued)

(56) References Cited

U.S. PATENT DOCUMENTS 6,396,170 B1    5/2002  Laufenberg et al.
6,967,283 B2   11/2005  Rasmussen et al.
(Continued)

FOREIGN PATENT DOCUMENTS

EP        2372861 B1    10/2011
JP     2009232521 A     10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — M. N. Von Buhr
(74) *Attorney, Agent, or Firm* — Adams Intellex, PLC

(57) ABSTRACT

In disclosed techniques, augmented power control within a datacenter uses predictive modeling. A power usage by a first data rack within a datacenter is measured, using one or more processors, over a first period of time. A predicted power usage by the first data rack over a second period of time is generated on a computing device, wherein the second period of time is subsequent to the first period of time. A power correlation model is calculated that correlates a power prediction to an actual power usage. The predicted power usage for the second period of time is refined, based on the predicted power usage and the power correlation model. The refining is accomplished using a power prediction model comprising the predicted power usage and the power cor-
(Continued)

relation model. Datacenter power structure is configured, based on the refined power usage prediction.

30 Claims, 12 Drawing Sheets

Related U.S. Application Data

(60) Provisional application No. 62/527,091, filed on Jun. 30, 2017, provisional application No. 62/480,386, filed on Apr. 1, 2017, provisional application No. 62/511,130, filed on May 25, 2017, provisional application No. 62/523,732, filed on Jun. 22, 2017, provisional application No. 62/550,009, filed on Aug. 25, 2017, provisional application No. 62/376,881, filed on Aug. 18, 2016.

(51) Int. Cl.
  *G06Q 10/06* (2012.01)
  *G06F 9/50* (2006.01)
  *G06F 19/00* (2018.01)
  *G06F 9/48* (2006.01)
  *H02J 3/00* (2006.01)

(52) U.S. Cl.
  CPC ............ *G06F 19/00* (2013.01); *H02J 3/0073* (2020.01); *H02J 3/14* (2013.01)

(58) Field of Classification Search
  CPC ........ H02J 3/14; H02J 2310/12; H02J 3/0073; Y02B 70/3225; Y02D 10/00; Y04S 20/222
  See application file for complete search history.

(56) References Cited

U.S. PATENT DOCUMENTS

| | | | |
|---|---|---|---|
| 7,236,896 B2 | 6/2007 | Farkas et al. | |
| 8,067,857 B2 | 11/2011 | Humphrey et al. | |
| 8,193,662 B1 | 6/2012 | Carlson et al. | |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,958,923 B2 | 2/2015 | Kake et al. | |
| 9,582,781 B1* | 2/2017 | Kearns | G06Q 10/0637 |
| 9,641,025 B2 | 5/2017 | Agrawal et al. | |
| 9,865,998 B1 | 1/2018 | Emert et al. | |
| 9,871,408 B2 | 1/2018 | Narita | |
| 2002/0099689 A1* | 7/2002 | Bergman | G06Q 10/067 |
| 2003/0056125 A1 | 3/2003 | O'Conner et al. | |
| 2005/0071092 A1 | 3/2005 | Farkas et al. | |
| 2005/0162019 A1 | 7/2005 | Masciarelli et al. | |
| 2005/0234761 A1* | 10/2005 | Pinto | G06Q 10/063 705/7.28 |
| 2006/0082222 A1 | 4/2006 | Pincu et al. | |
| 2007/0216229 A1 | 9/2007 | Johnson, Jr. et al. | |
| 2008/0067872 A1 | 3/2008 | Moth | |
| 2008/0320322 A1 | 12/2008 | Green et al. | |
| 2009/0144568 A1 | 6/2009 | Fung | |
| 2010/0037070 A1 | 2/2010 | Brumley et al. | |
| 2010/0037225 A1 | 2/2010 | Doyle et al. | |
| 2010/0058092 A1 | 3/2010 | Bougaev et al. | |
| 2010/0077238 A1 | 3/2010 | Vogman et al. | |
| 2010/0102633 A1 | 4/2010 | Seaton | |
| 2010/0205469 A1 | 8/2010 | McCarthy et al. | |
| 2010/0211810 A1 | 8/2010 | Nacho | |
| 2010/0235654 A1* | 9/2010 | Malik | G06F 1/3209 713/300 |
| 2010/0264741 A1 | 10/2010 | Togare | |
| 2010/0328849 A1 | 12/2010 | Ewing et al. | |
| 2011/0133559 A1 | 6/2011 | Yamashita et al. | |
| 2011/0245988 A1* | 10/2011 | Ingels | G06F 1/26 700/295 |
| 2011/0264937 A1 | 10/2011 | Meisner et al. | |
| 2011/0302432 A1 | 12/2011 | Harris et al. | |
| 2011/0304211 A1 | 12/2011 | Peterson et al. | |
| 2012/0054512 A1 | 3/2012 | Archibald et al. | |
| 2012/0066519 A1 | 3/2012 | El-Essawy et al. | |
| 2012/0303993 A1 | 11/2012 | Nishtala et al. | |
| 2012/0326504 A1* | 12/2012 | Ballantine | H02J 3/006 307/24 |
| 2015/0057821 A1* | 2/2015 | Nasle | G06Q 10/04 700/291 |
| 2015/0112891 A1* | 4/2015 | Watanabe | G06N 5/048 706/1 |
| 2015/0199215 A1* | 7/2015 | Mankovskii | G06F 9/5094 718/102 |
| 2015/0324686 A1* | 11/2015 | Julian | G06N 20/00 706/25 |
| 2015/0324690 A1* | 11/2015 | Chilimbi | G06N 3/08 706/25 |
| 2015/0378408 A1 | 12/2015 | Kaplan | |
| 2015/0380968 A1 | 12/2015 | Lee | |
| 2016/0020609 A1 | 1/2016 | Carrasco et al. | |
| 2016/0109916 A1* | 4/2016 | Li | H02J 9/062 700/295 |
| 2016/0195911 A1* | 7/2016 | Chapel | G06F 1/3287 713/340 |
| 2016/0209901 A1 | 7/2016 | Wilcox et al. | |
| 2016/0320825 A1* | 11/2016 | Panda | G06F 1/3206 |
| 2016/0356633 A1* | 12/2016 | Mohan | G01D 21/02 |
| 2016/0363976 A1* | 12/2016 | Gatson | G06F 1/26 |
| 2016/0363987 A1* | 12/2016 | Malik | H04L 41/5003 |
| 2017/0005515 A1 | 1/2017 | Sanders | |
| 2017/0025876 A1* | 1/2017 | Chan | H02J 7/0068 |
| 2017/0154345 A1* | 6/2017 | Wang | G06Q 10/067 |
| 2017/0177047 A1 | 6/2017 | Fluman et al. | |
| 2017/0201425 A1 | 7/2017 | Marinelli et al. | |
| 2017/0322241 A1 | 11/2017 | Tang et al. | |
| 2017/0336768 A1* | 11/2017 | Geffin | G05B 15/02 |
| 2018/0136992 A1* | 5/2018 | Solinger | G06F 13/36 |
| 2018/0144244 A1* | 5/2018 | Masoud | G16H 30/40 |
| 2018/0268290 A1* | 9/2018 | Bose | G06N 3/082 |
| 2019/0122132 A1* | 4/2019 | Rimini | G06Q 10/04 |
| 2019/0245451 A1* | 8/2019 | Sagneri | H02M 3/337 |

FOREIGN PATENT DOCUMENTS

| | | |
|---|---|---|
| WO | WO2011119444 A2 | 9/2011 |
| WO | WO2012091323 A2 | 7/2012 |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

Muccini, Mark, el al., "Power Consumption Reduction: Hot Spare", A Dell technical white paper, Feb. 2012, Rev. 1.0, Dell, Inc.

Meisner, David, Brian T. Gold, and Thomas F. Wenisch. "PowerNap: eliminating server idle power." ACM SIGARCH Computer Architecture News 37.1 (2009): 205-216.

International Search Report dated Feb. 9, 2015 for PCT/US2014/062650.

International Search Report dated Jan. 30, 2015 for PCT/US2014/062684.

* cited by examiner

AUGMENTED POWER CONTROL WITHIN A DATACENTER USING PREDICTIVE MODELING

RELATED APPLICATIONS

This application claims the benefit of U.S. provisional patent applications "Augmented Power Control Determination Within a Datacenter" Ser. No. 62/527,091, filed Jun. 30, 2017, "Data Center Power Scenario Simulation" Ser. No. 62/480,386, filed Apr. 1, 2017, "Secure Communication Initiation and Execution for Data Center Power Control" Ser. No. 62/511,130, filed May 25, 2017, "Datacenter Power Management Using AC and DC Power Sources" Ser. No. 62/523,732, filed Jun. 22, 2017, "Scalable Datacenter Power Infrastructure Management" Ser. No. 62/550,009, filed Aug. 25, 2017. This application is a continuation-in-part of U.S. patent application "Datacenter Power Management Using Variable Power Sources" U.S. Ser. No. 15/680,286, filed Aug. 18, 2017, which claims the benefit of U.S. provisional patent application "Automated Intelligent Scheduling of Energy Storage in Data Centers" Ser. No. 62/376,881, filed Aug. 18, 2016. Each of the foregoing applications is hereby incorporated by reference in its entirety.

FIELD OF ART

This application relates generally to power management and more particularly to augmented power control within a datacenter using predictive modeling.

BACKGROUND

A datacenter is a facility which is owned, leased, or operated by one or more organizations including search providers, on-line retailers, financial institutions, research laboratories, universities, and other computing-intensive organizations. Protecting the physical security and reliability of datacenters and most important, protecting the organizations' information, are paramount objectives for the organizations. The datacenter, or "server farm", is a centralized facility that houses information technology (IT) operations and equipment. A datacenter is used to store, process, manage, and disseminate valuable data. The datacenter houses a network of varied, critical systems, the continuous operations of which are vital to the organizations. The collocation of the computing and electrical equipment simplifies management and control of the equipment. Further, collocation simplifies installation, maintenance, and security operations. The datacenters contain a large number of servers along with network and computer equipment to process, store, and exchange data as needed to execute desired functionality. Such functionality typically includes the storage, processing, and retrieval of data. A datacenter includes many data racks, also referred to as information technology (IT) racks. In some installations, there can be hundreds, or even thousands of racks. Each server rack, in turn, includes many servers and other associated computer equipment.

Computer systems include electrical components that consume power. The electrical components include printed circuit boards with integrated circuits, mass storage devices, networking interfaces, and processors. Reliable and efficient power delivery is crucial for successful operation of the computer systems, particularly in light of the precise and ever-increasing power requirements demanded by these components. Further complicating the delivery of power to the datacenter are the reliability and availability requirements that the data center infrastructure must meet or exceed. The datacenter infrastructure can be dictated by predetermined statutory requirements. The statutory requirements can apply to financial institutions and hospitals, due to the storage and handling of highly confidential data. Further, educational organizations and retail organizations must meet statutory requirements that demand that certain standards be met to ensure the protection of personal student and customer data. The statutory requirements demand stringent safeguards on the physical and technical security of personal data.

Additional datacenter infrastructure requirements must be met because of issues such as availability, reliability, job load, and other organizational demands. The effective cooling of a data center (i.e. the removal of excess heat) is among the most important requirements. Effective cooling ensures stable and reliable operation of the center. Each of the many devices in the data center generates copious amounts of heat, whether the device is a server, a blade, a switch, a backup unit, a communications unit, or another device. In fact, the issue of cooling modern data centers has become such a critical design criterion that it directly impacts the layout and design of the center. To address the cooling issues, some data centers are arranged in "hot rows" and "cold rows". Equipment that generates excess heat is grouped together in "hot rows". The hot rows are surrounded by rows of cooler-running equipment grouped in "cold rows". The cold rows are named for their ability to serve as heat sinks, absorbing some of the excess heat from the "hot" equipment. Other datacenters are designed with cooling devices placed directly adjacent to particularly hot devices, with the cooling devices including fans, air conditioning units, water cooling systems, and so on. Another significant data center design consideration involves providing sufficient power to the data center. Particularly in the case of high-reliability data centers, power can be provided by more than one power grid to provide redundancy, while for other data centers, power can be provided by a combination of a power grid and locally generated power. Regardless of how the power is provided to the data center, providing reliable and efficient power to the large number of computers and associated equipment in modern data centers is an important aspect of successful operation of such facilities.

SUMMARY

The delivery of reliable power in sufficient quantities to a datacenter is critical to the effective operation of the datacenter. Power delivery is generally a costly endeavor due to the expense of the infrastructure, the need for power source redundancy, contractual requirements for reliability, the need to provide multiple types of power such as AC and DC power at different voltages, datacenter resilience, and so on. Datacenter resilience addresses disaster planning, disaster recovery, etc. To meet the many power needs of a datacenter, power is obtained from multiple sources. The sources can include grid power, locally generated power, renewable power, backup power, etc. Since the cost of power delivery is expensive, the configuring of the power structure of the datacenter is critical. If the configuration of the datacenter power structure is over-specified, then excess, unneeded power is paid for but remains unused. If the configuration of the datacenter power structure is under-specified, then insufficient power is available, leaving equipment unable to operate. Both scenarios can spell financial disaster for the datacenter. Instead, the datacenter power structure must provide the needed power in a flexible and cost-effective manner.

The power that is supplied must be delivered when and where the power is required within a datacenter. That is, the many electrical components that are found in the datacenter require sufficient power. If the power is not available when needed, then the equipment will not operate. The power requirements of a datacenter can vary over time based on factors such as application activity, planned maintenance, unplanned equipment failure, seasonal factors, and so on. Datacenters provide vital functions for businesses, governments, educational institutions, and other enterprises. Characterizing the behavior of datacenter power consumption is essential to understanding how to maintain consistent reliability of the datacenters. Disclosed techniques address augmented power control within a datacenter using predictive modeling. A power usage by a first data rack within a datacenter is measured, using one or more processors, over a first period of time. A predicted power usage by the first data rack over a second period of time is generated, on a computing device, wherein the second period of time is subsequent to the first period of time. A power correlation model is calculated, on the computing device, that correlates a power prediction to an actual power usage. The predicted power usage for the second period of time is refined, on the computing device, based on the predicted power usage and the power correlation model. Datacenter power structure is configured, using the one or more processors, based on the refined power usage prediction.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
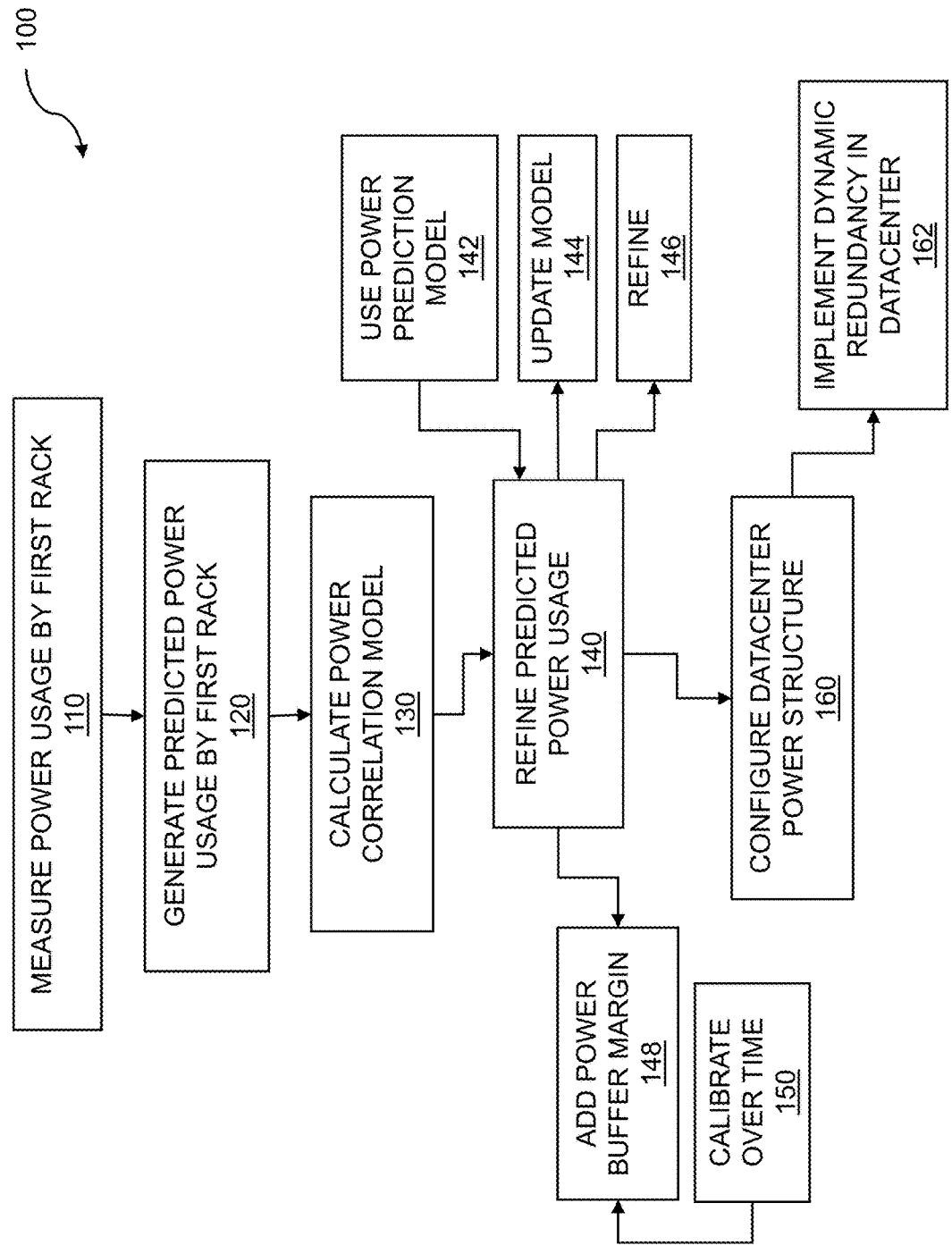
FIG. 1 is a flow diagram for augmented power control within a datacenter using predictive modeling.

This disclosure provides techniques for augmented power control within a datacenter using predictive modeling. Managing power distribution for efficiency and reliability can be challenging, particularly in datacenters. Datacenter power systems are designed to meet the dynamic power needs of large installations of diverse electrical equipment. The wide range of electrical equipment that can be present in a datacenter can include devices such as servers, blade servers, communications switches, network routers, backup data storage units, communications hardware, and other devices. The electrical equipment can include one or more of processors, data servers, server racks, and heating, ventilating, and air conditioning (HVAC) units. The HVAC units are installed to control the copious heat that is generated by all pieces of the electrical equipment in the datacenter.

The power systems receive power from multiple power feeds, where the coupled power feeds can derive grid power such as hydro, wind, solar, nuclear, coal, or other power plants; local power generation from micro-hydro, wind, solar, geothermal, etc.; diesel generator (DG) sets; and so on. The multiple power feeds, which typically number at least two, provide critical power source redundancy in delivering the power to the datacenter power infrastructure. That is, if one power feed were to go down due to failure or be taken offline for maintenance, another power feed can take its place in providing the dynamic power needed to drive the power load of large equipment installations, such as datacenters. The power feeds are coupled to master switch blocks (MSB), switch blocks (SB), and central uninterruptable power supplies (UPS), which are coupled to one or more power distribution units (PDU). The PDUs are connected to one or more electrical loads and distribute dynamic power to the various coupled loads. The loads can include widely varying dynamic loads, such as those presented by the electrical equipment found of the datacenters. The power that is provided can be based on a specific voltage, current, wattage; multiple voltages, currents, and wattages; etc. The UPS units can provide multiple functions such as over voltage limiting, under voltage limiting, battery backup, charge control, inversion (e.g. convert D.C. battery power to A.C. power), etc. Similar to the multiple power feeds, each central UPS can provide sufficient power to drive the dynamic power loads coupled to a given feed. Each central UPS continues to provide power until the batteries in the UPS discharge to a certain level of remaining charge.

Power control within a datacenter can be based on measured power usage, predicted power usage, and so on. The measured power usage can be augmented with the predicted power usage, where the power predictions are based on a predictive model. The augmented power usage can be based on forecasted power usage. Arrangements can be made to provide that predicted power. When the predictions are successful, the predicted power is for a 99% power consumption value.

In disclosed techniques, a computer-implemented method for power management is used for augmented power control within a datacenter using predictive modeling. A power usage by a first data rack within a datacenter is measured, using one or more processors, over a first period of time. A predicted power usage by the first data rack is generated, on a computing device, over a second period of time, wherein the second period of time is subsequent to the first period of time. A power correlation model is calculated, on the computing device, where the power correlation model correlates a power prediction to an actual power usage. The predicted power usage for the second period of time is refined, on the computing device, based on the predicted power usage and the power correlation model. Datacenter power structure is configured, using the one or more processors, based on the refined power usage prediction.

FIG. 1 is a flow diagram for augmented power control within a datacenter using predictive modeling. Augmented power control within a datacenter uses a power predictive model. The power prediction model can include predicted power usage and a power correlation model. The flow 100 shows a computer-implemented method for power management. The flow 100 includes measuring, using one or more processors, a power usage by a first data rack 110 within a datacenter over a first period of time. The first data rack, also called an information technology (IT) rack, can contain a variety of electrical equipment commonly located in a datacenter. The electrical equipment can include servers, communication equipment, disk farms, storage and backup equipment, heating, cooling and air conditioning (HVAC) equipment, and so on. The measuring of power usage can be accomplished using a variety of equipment, such as power distribution equipment, found in the datacenter. In embodiments, the measuring of the power usage can be accomplished using information on power distribution units (PDUs), servers, power switches, power caches, or power sensors for the first data rack. Various amounts of time can be used for the first period of time over which power is measured. In embodiments, the first period of time comprises ten seconds of time. Other amounts of time can be used such as 20 seconds, less than a minute, and so on. Power usage measurement information can be transferred over a wired, wireless, or hybrid network, to a computing device, a server, etc. The measuring of power usage can include measuring current in Amperes, potential in Volts, power in Watts, and so on. The power usage can be based on direct current (DC) voltages, alternating current (AC) voltages, both DC and AC voltages, etc. In embodiments, the measuring the power usage by the first data rack can include determining an average power usage during a first period of time. Other power usage measurements can include changes (delta) in power usage.

The flow 100 includes generating, on a computing device, a predicted power usage by the first data rack 120 over a second period of time. In embodiments, the one or more processors are located on the computing device. The second period of time can be subsequent to the first period of time. The first period of time and the second period of time can be for a granular period of time. A granular period of time can include an amount of time such as seconds, minutes, and so on. In embodiments, the granular period of time can be for less than a minute. The granular period of time can include a sampling rate and sample duration to measure power usage. In embodiments, the granular period of time can be for approximately ten seconds. The granular period of time can include other amounts of time. In other embodiments, the granular period of time can be for approximately twenty seconds of time. The first period of time can be the same as or different from the second period of time. In embodiments, the granular period of time can be for less than a minute.

The prediction of power usage by the first data rack over a second period of time or other future period time is critical to determine the provisioning of power within the datacenter. When power is provisioned properly, the electrical equipment in a data or IT rack can receive adequate power required to operate the electrical equipment, to process the job mix assigned to processors in the IT rack, and so on. In embodiments, the predicted power usage can be based on applications running on the first data rack. The generation of the predicted power usage can be based on historical experience for power usage. In embodiments, the historical experience can include past miscalculations of power usage. For example, previous prediction "misses", that is, the predictions for power usage that either underestimated or overestimated provisioned power, can be used to generate a better prediction of future power usage. Historical data is used for other prediction purposes, as will be discussed shortly. The flow 100 includes calculating, on the computing device, a power correlation model 130 that correlates a power prediction to an actual power usage. The power correlation model can include machine learning, where the machine learning can include various techniques such as artificial neural networks, deep learning, support vector machines (SVM), Bayesian networks, and so on. In embodiments, the power correlation model can include coefficients, tree logic, or algorithm logic based on historical experience with predicted power usage and actual power usage within the datacenter.

The flow 100 includes refining, on the computing device, the predicted power usage 140 for the second period of time, based on the predicted power usage and the power correlation model. As discussed previously, power usage prediction can generate a plan for configuring datacenter power to computing and other electrical equipment in an IT rack over a second period of time or other period of time such as a future period of time. In embodiments, the refining is accomplished using a power prediction model 142. The power prediction model can include the predicted power usage and the power correlation model. The results of the predicted power usage can be compared to the measured power usage to determine the efficacy of the power correlation model. In embodiments, the refining further comprises refining predicted power usage for a third period of time. The third period of time can be subsequent the second period of time. Recall that the second period of time can be subsequent to the first period of time. The refining the predicted power usage for the second period of time, the third period of time, and other periods of time, can be based on the power correlation model. The refining can result in a refined power usage prediction.

The refining of the power usage prediction can be based on past or historical predictions which either over-allocated power or under-allocated power. In embodiments, the historical experience can include past miscalculations of power usage. The refining of the power usage prediction can be based on error, percent error, breach size, deviation size, and so on. The refining the predicted power usage can be based on aggregating power usage measurements. The aggregating can include aggregating the power usage by a first data rack with the power usage by a second data rack over the first period of time. The aggregating can further include aggregating the power usage by further data racks with the power usage by a first data rack. Other refinements and updates to models, parameters, weights, and so on, can be made. In embodiments, the refining further includes updating the power prediction model 144 based on the refining. The refining the power prediction model can be undertaken for a given data rack and IT rack, and for other data racks and IT racks, and for other periods of time. Other embodiments include refining 146 predicted power usage for a third period of time. The third period of time is subsequent the second period of time. The second period of time can be subsequent to the first period of time. The refining can be based on the power correlation model. In the flow 100, the refining includes adding a power buffer margin 148. The power buffer margin can be calibrated over time 150, where the calibration can include over-estimates or under-estimates of power usage requirements, cost advantages, and so on. The power buffer margin can be used to cover an actual power usage which exceeds a predicted power usage. In embodiments, the power buffer margin is used in a first power rack that was part of the measuring the power usage. The power buffer margin for the first rack can be applied to power buffer margins for other racks. In embodiments, the power buffer margin is used for a second power rack.

Other determinations can be made for the refined power usage prediction. Refinements can include determining metrics for accuracy of the refined power usage prediction. The metrics for accuracy can include comparisons to total power, maximum power, minimum power, and so on. A permissible accuracy can be determined, where the permissible accuracy can be associated with the metrics for accuracy on the refined power usage prediction. The permissible accuracy can include counts, absolute errors, relative errors, percentage errors, and so on. There can be various levels, degrees, etc. of accuracy. The determining a permissible accuracy can include a coarse accuracy. A course accuracy can include average power usage over a period of time, a percent power usage such as a minimum power usage, etc. In other embodiments, the determining a permissible accuracy can include a fine accuracy. A fine accuracy can include power usage at a given point of time within the period of time. A fine accuracy can include a highly accurate power prediction such as a 99% power consumption value. Various techniques such as algorithms, heuristics, and so on, can be used to refine power usage prediction.

The refining can be based on performing quantile regression as part of the refining the power usage prediction. Regression analysis can be used to estimate a mean of predicted power usage. Quantile regression, a type of regression analysis, can be used to estimate other quantiles of predicted power usage. The quantile regression can be based on Markov models. In embodiments, the determining can be for a 99% power consumption value. Determining refined power usage prediction can include consideration of spike power usage. Spikes in power usage can occur due to electrical equipment being turned on and off, on-processing job mixes assigned to processors in data racks, and so on. In embodiments, determining refined power usage prediction can include factoring in regular spike power usage as part of the determining. The spikes which can include peak patterns in power usage can be due to a seasonality component. The seasonality component can include spikes in power usage based on daily spikes, weekly spikes, monthly spikes, and so on.

The flow 100 includes configuring, using the one or more processors, datacenter power structure 160. The configuring the datacenter power structure is based on the refined power usage prediction. Configuring datacenter power can include configuring power supplies, power caches such as batteries, uninterruptable power supplies (UPS), and so on. The configuring datacenter power can include configuring power within data racks, rows of data racks, clusters of data and IT racks, etc. The configuring can be used for implementing dynamic redundancy 162 within the datacenter. Dynamic redundancy can include providing redundant power such as 2N redundancy of power for a given period of time. In embodiments, the implementing dynamic redundancy can be accomplished using a policy for a power switch within the datacenter based on the refined power usage prediction. A power policy can include which sources of power may be used, the amount of time the sources may be used, the total usage time for a source, and so on. A power policy can be defined by an administrator at the data center, a local power utility, or the like. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
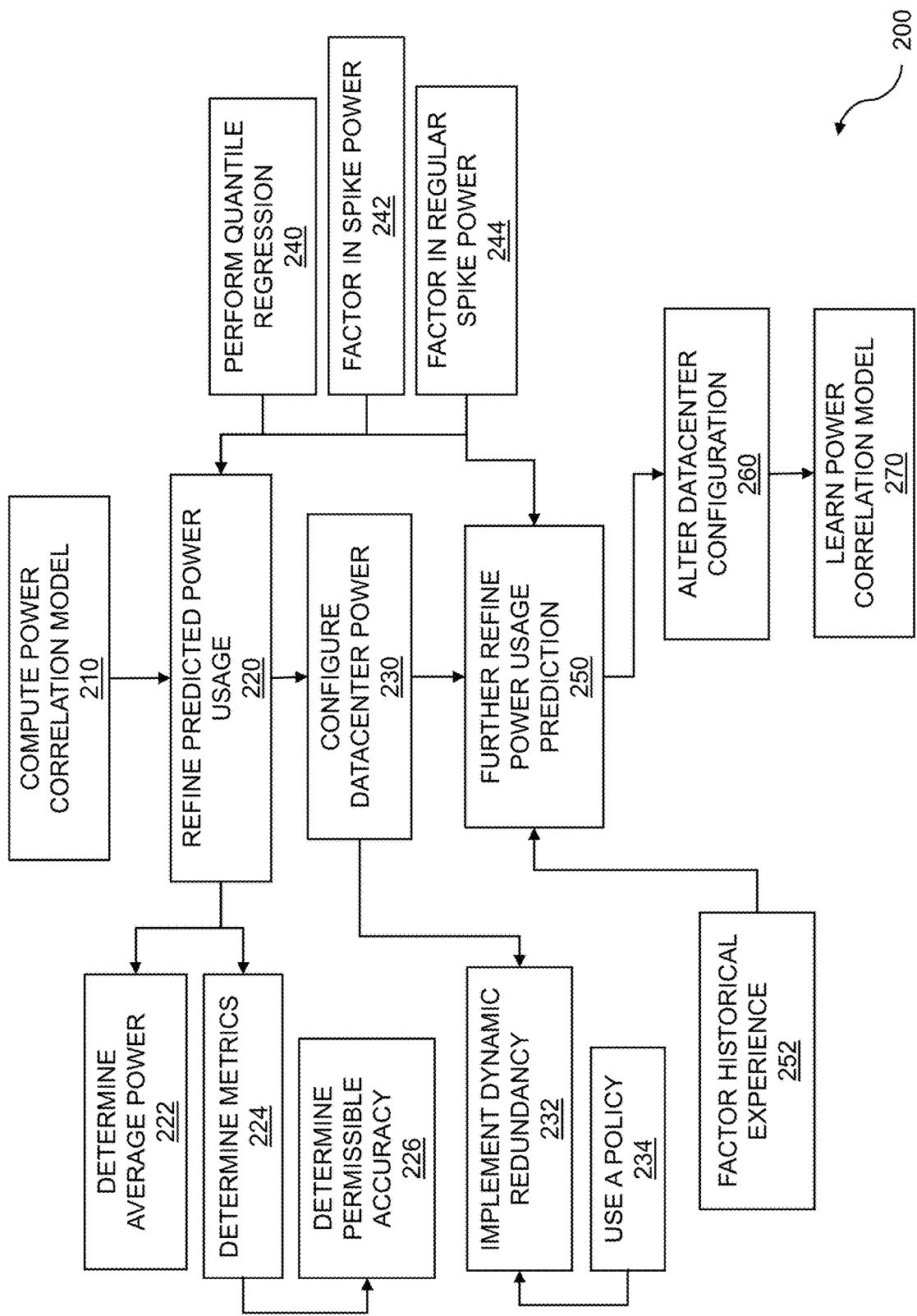
FIG. 2 is a flow diagram for learning a power correlation model.

FIG. 2 is a flow diagram for learning a power correlation model. A power correlation model can be calculated that correlates a power prediction with an actual power usage. The power prediction is used to configure power to information technology (IT) and other electrical equipment at a future time. The learning can be based on machine learning, where the machine learning can include a variety of techniques such as artificial neural networks, deep learning, support vector machines (SVM), Bayesian networks, and so on. The machine learning can be used to improve the power correlation model to predict power load per data rack, per information technology (IT) rack, for various pieces of electrical equipment, and so on, for a configurable period of time. The learning is used for augmented power control within a datacenter using predictive modeling.

The flow 200 includes calculating, on the computing device, a power correlation model 210 that correlates a power prediction to an actual power usage. The actual power usage can be obtained by measuring a power usage of one or more data racks and information technology (IT) racks, such as a first rack, a second rack, other racks, and so on, for a first period of time. The power prediction can include a prediction of the power requirements of the data racks, IT racks, electrical equipment, etc. The flow 200 includes refining, on the computing device, the predicted power usage 220 for a second period of time, based on the predicted power usage and the power correlation model. The refining can be accomplished using a power prediction model that can include the predicted power usage and the power correlation model. The refining can include adjusting coefficients and weights of the power correlation model, where the model can be a learned model. In embodiments, the refining can further include updating the power prediction model based on the refining. The refining can be based on other measurements, parameters, metrics, and so on. In embodiments, the measuring the power usage by the first data rack can include determining an average power usage 222 during the first period of time. In other embodiments, the refining the predicted power usage can include determining an average power for the refined power usage prediction during the second period of time. The first period of time and the second period of time can be specific amounts of time. In embodiments, the first period of time and the second period of time can be a granular period of time. A granular period of time can include 10 seconds, 20 seconds, less than a minute, or another amount of time, an approximate amount of time, etc.

The refining predicted power usage can further include determining metrics for accuracy 224 of the refined power usage prediction. The metrics for accuracy can include a percentage, a range of values, a threshold value, and so on. The metrics for accuracy can be based on power policies, where the power policies can be set for the datacenter. The flow 200 can further include determining a permissible accuracy 226 associated with the metrics for accuracy on the refined power usage prediction. The metrics for accuracy can include a percentage, a range of values, limit values, threshold values, and so on. In embodiments, the determining a permissible accuracy can include a coarse accuracy. The coarse accuracy can be used to quickly determine a viable range of values for metrics while reducing or minimizing computation requirements, cost, and so on. In other embodiments, the determining a permissible accuracy can include a fine accuracy. The accuracy can be sought to better match power usage predictions to actual power usage to ensure that power requirements are met at reduced or minimal cost.

The flow 200 includes configuring, using the one or more processors, datacenter power structure 230, based on the refined power usage prediction. The configuring datacenter power structure can include assigning power feeds, backup power sources, alternative power sources, and so on, to dataracks, IT racks, electrical equipment, and so on, within a datacenter. The configuring datacenter power structure can be based on cost, expediency, efficiency, contractual requirements, and so on. In embodiments, the configuring can be used for implementing dynamic redundancy 232 within the datacenter. Dynamic redundancy can be used to provide surplus power from one datarack or IT rack to another datarack or IT rack. The surplus power can be available for job mix, seasonal requirements, and so on. In embodiments, the implementing dynamic redundancy can be accomplished using a policy 234 for a power switch within the datacenter based on the refined power usage prediction. The policy can be based on cost, equipment availability, equipment usage, mean time to failure (MTTF) predictions, etc.

Returning to the refining predicted power usage, the refining can be based on using various techniques, taking into account characteristic of the power usage, and so on. In embodiments, the flow 200 further includes performing quantile regression 240 as part of the refining the predicted power usage. Different from linear regression which can seek a conditional mean, quantile regression can seek various quantiles in addition to the conditional mean. The various quantiles can include 50% (mean), or other percentages. In embodiments, the performing quantile regressing is for a 99% power consumption value. The quantile regression can be performed for other power consumption values. The flow 200 can further include factoring in spike power usage 242 as part of the refining the predicted power usage. The spike power usage can be based on both anticipated spikes such as those spikes based on job mix or due to hot weather, and unanticipated spikes. The flow 200 can further include factoring in regular spike power usage 244 as part of the refining the predicted power usage. The spike power usage can be based on job mix, for a given day, week, month, year, and so on. The spike power usage can be based on seasonal factors such as increased use of air conditioning during hot months, and reduced use of air conditioning during cold months.

The refining predicted power usage can also be applied to further refinement of the power usage prediction. The flow 200 includes further refining the refined power usage prediction 250. The further refining the refined power usage prediction can include using peak power patterns (including power patterns that are "spikey" or "peaky") that are detected. As discussed above, the further refinement of the power usage prediction can use quantile regression, where the quantile regression can include a 99% value. The further refining the refined power usage prediction can factor in spike power, regular spike power, and so on. The further refining can include adjusting a power correlation model. The power correlation model can include coefficients, tree logic, or algorithm logic. In embodiments, the power correction model can be based on historical experience 252 with predicted power usage and actual power usage within the datacenter. In embodiments, the historical experience can include past miscalculations of power usage. The power usage prediction "misses" can be noted and avoided as part of future predictions of power usage. In other embodiments, the refining the predicted power usage is based on an historical period of time. The historical period of time can include a past day, week, month, year, season, and so on. In embodiments, the historical period of time includes a seasonality component.

The flow 200 further includes altering a datacenter configuration 260 based on the refined power usage prediction. The altering the datacenter configuration can include reconfiguring the distribution of one or more power feeds to the data racks, IT racks, datacenter electrical equipment, and so on. The reconfiguring of the distribution of the one or more power feeds can be dynamic. The altering the datacenter configuration can include the power feeds, backup power, locally generated power, alternative energy sources, and so on. The flow 200 further includes performing learning to determine the power correlation model 270. The learning can include data from measure power usage, predicted power usage, seasonal influences, processing job mix, and so on. The learning can be used to improve the power correlation model, where improvements can include attaining the 99% quantile, reducing cost, storing excess power, and the like. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
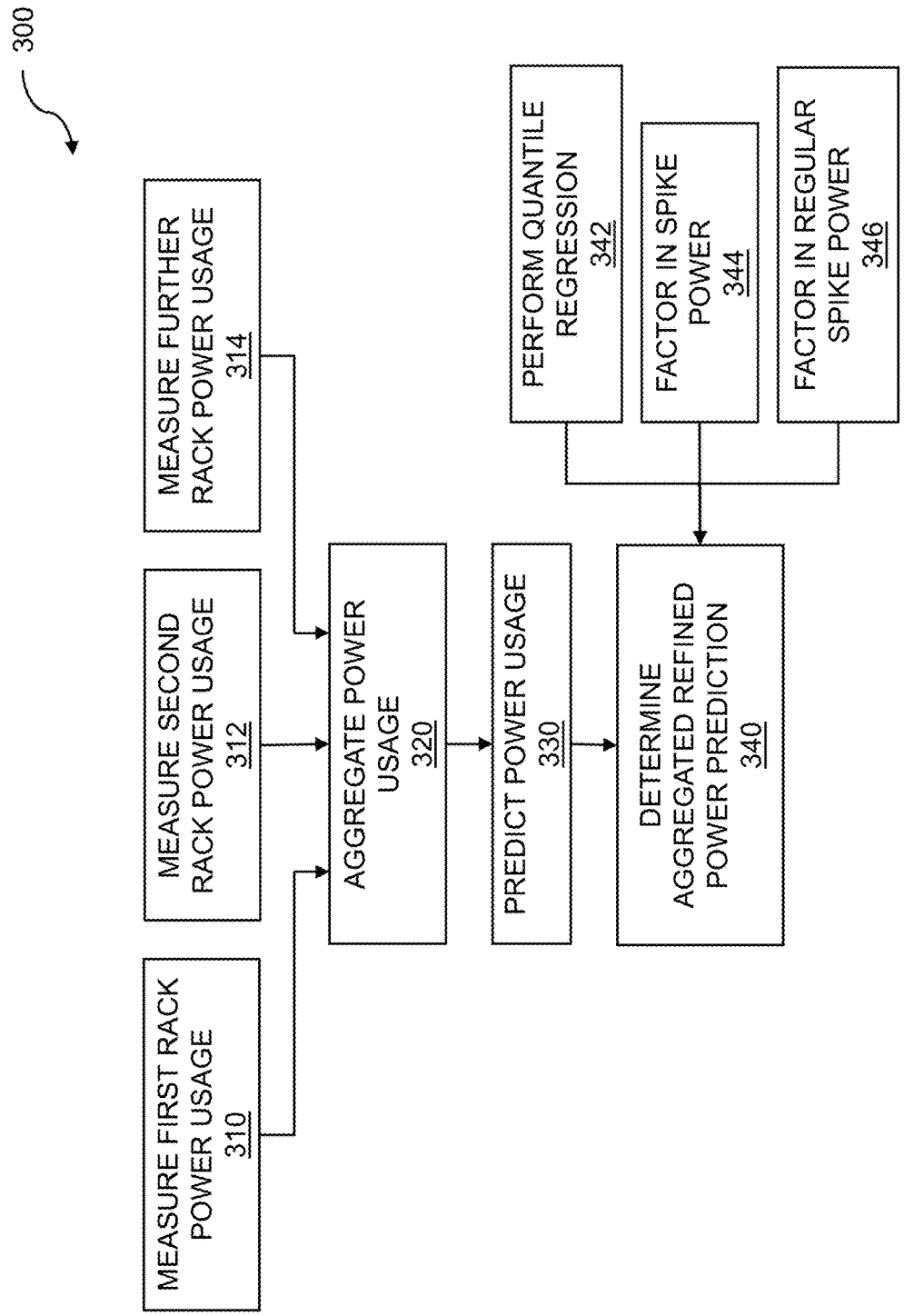
FIG. 3 is a flow diagram for aggregating refined power prediction.

FIG. 3 is a flow diagram for aggregating refined power prediction. Power can be measured and the measurements aggregated in order to refine a power prediction. The power prediction can include predicting the future power usage of one or more data racks or information technology (IT) racks. The power prediction can be used for controlling power to IT equipment, electrical equipment, and so on. Augmented power control within a datacenter uses predictive modeling. The predictive modeling is used for predicting power usage by the IT equipment, electrical equipment, etc. The flow 300 includes measuring a power usage by a first data rack 310 within a datacenter over a first period of time. The period of time can include a time frame, where the time frame can include 10 seconds, 20 seconds, less than a minute, or another amount of time. The measuring power usage can be applied to other data racks, which can also be called information technology racks. The flow 300 includes measuring a power usage by a second data rack 312 within the datacenter over the first period of time. Further power usage measurements can be made. The flow 300 includes measuring power usage by further data racks 314 within the datacenter over the first period of time. The number of datacenter IT racks for which power usage can be measured can include some or all of the IT racks in the data center. Power usage can be measured across multiple data centers.

The flow 300 includes aggregating the power usage 320 by a first data rack with the power usage by a second data rack over the first period of time. The aggregating the power usage can include averaging or otherwise combining the power usage data. The aggregating can further include aggregating the power usage by further data racks with the power usage by a first data rack. The flow 300 includes generating a predicted power usage 330 for the datacenter over the second period of time based on the power usage, by a first data rack and the further data racks, that was aggregated. The power usage data that can be aggregated can include the power usage data of the first data (IT) rack and the second data (IT) rack. In embodiments, generating a predicted power usage for the datacenter over the second period of time can be based on the power usage, by a first data rack and the further data racks, that was aggregated.

The flow 300 includes determining an aggregated refined power usage prediction 340 for the datacenter can be based on the predicted power usage that was aggregated and the power correlation model. Measured power usage data can be used to refine a power usage prediction for future power usage requirements. The refinement can be based on measured data from the first data rack, the second data, further data racks, etc. The refining of a power usage prediction can be based on various algorithms and heuristics. In embodiments, the flow 300 includes performing quantile regression 342 as part of the determining the refined power usage prediction. The performing quantile regression can include performing for a 99% power consumption value. The flow 300 includes factoring in spike power 344 usage as part of the refining the predicted power usage. The spike power usage can be due to job processing mix, electrical equipment being enabled and disabled, and so on. The flow 300 includes factoring in regular spike power 346 usage as part of the refining the predicted power usage. Regular spike power can include peak power usage patterns such as seasonal curves, where the seasonal curves can include daily, weekly, monthly, yearly, etc., power usage spikes. Various steps in the flow 300 may be changed in order, repeated, omitted, or the like without departing from the disclosed concepts. Various embodiments of the flow 300 can be included in a computer program product embodied in a non-transitory computer readable medium that includes code executable by one or more processors.

Figure 4:
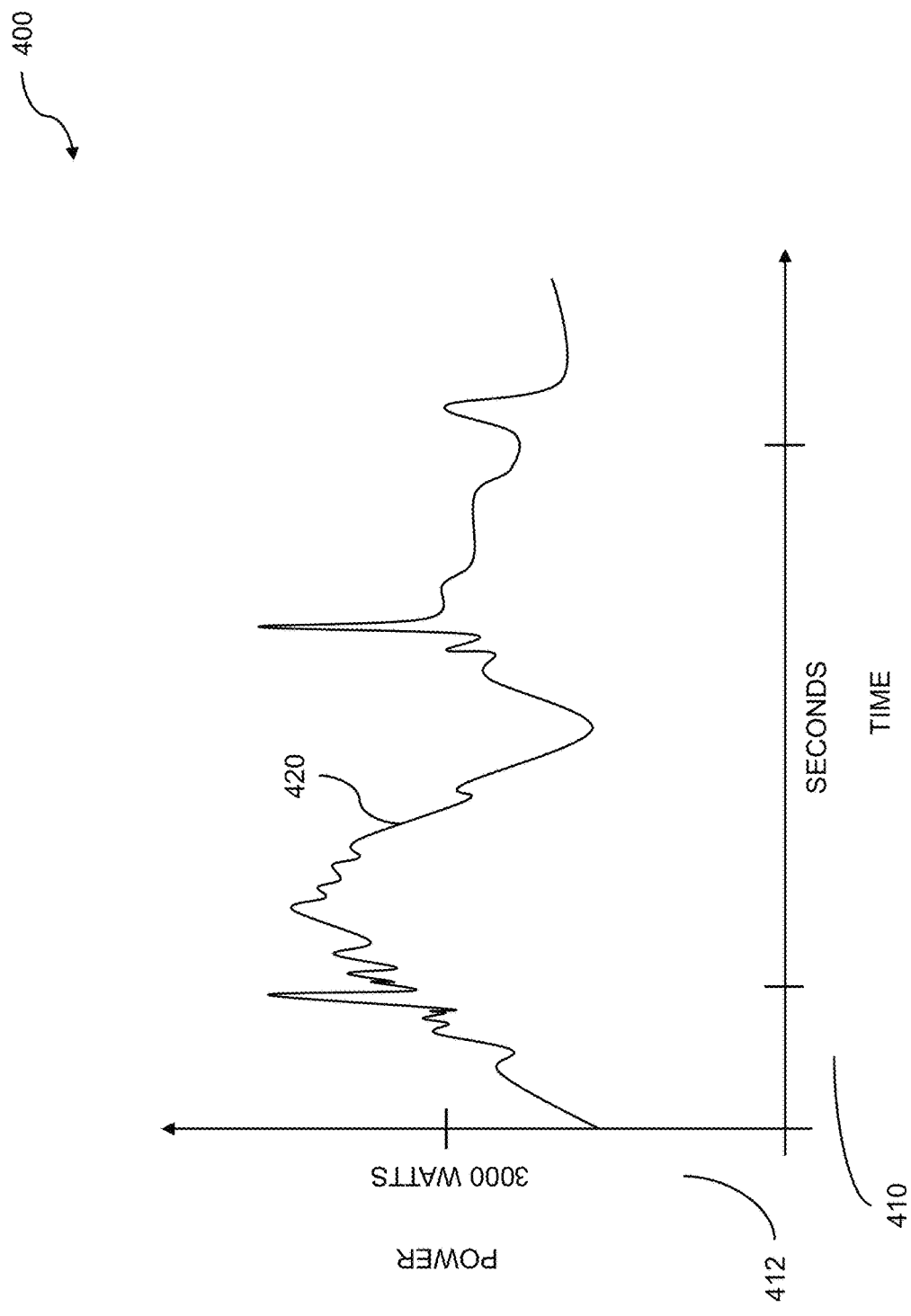
FIG. 4 shows datacenter power usage over time.

FIG. 4 shows datacenter power usage over time. Power usage in a datacenter varies over time due to numerous factors including which items of information technology (IT) equipment are operating or being powered on and off, which items of other electrical equipment are operating or being switched on and off, job processing requirements, seasonal factors, and so on. Power control, where power is routed to IT and other electrical equipment must be able to match power supplies to power demands. Power control can include predicting power requirements for IT and other electrical equipment at a future time. Augmented power control within a datacenter uses predictive modeling. A power consumption curve 400 can be based on measuring power usage by one or more data racks. Data racks, also called information technology racks, can include a variety of IT equipment such as servers, switches, storage devices, communications switches, and so on.

A graph 400 includes a horizontal axis 410 representing time and a vertical axis 412 representing power usage by a power load (such as a datacenter group, cluster, or data rack). The power usage value can include a nominal value such as 3000 watts (W). The 3000 W value can be for an individual rack. The power usage nominal value can be established based on a power policy. The power policy can be defined by an administrator at the datacenter, a local power utility, or the like. Actual power usage can be plotted 420. Various features of the power usage plot 420 can be identified, where the features can include large deviations in demand (i.e. spikiness), seasonal curves, and so on. The deviations can be based on equipment that is being powered at a given time, on job mix, and so on. The erratic deviations of the power usage curve 420 can be considered as part of the determining future power usage. In embodiments, the power usage curve can include an historical period of time, where the historical period of time can include a seasonality component. With respect to seasonality component in power usage, the changing power usage requirements can be based on daily equipment usage, daily job mix, weekly equipment usage, weekly job mix, and so on.

Figure 5:
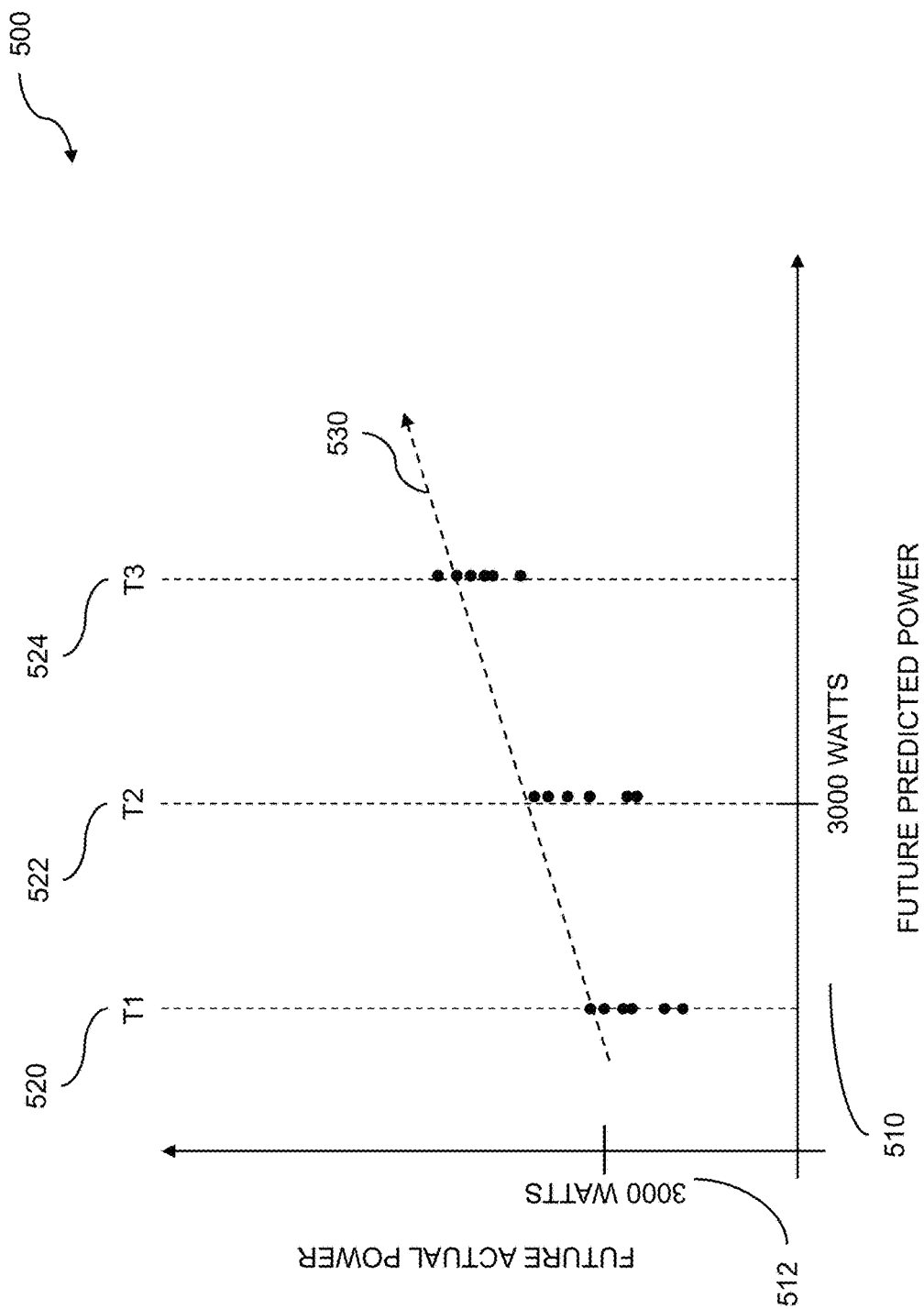
FIG. 5 illustrates actual power versus predicted power.

FIG. 5 illustrates actual power versus predicted power. Power usage by a data rack in a datacenter can be measured over a first period of time, and a prediction can be made of the power usage for the data rack over a second period of time. The predicted power usage can be refined using a power prediction model that includes the predicted power usage and a power correlation model. Augmented power control within a datacenter uses predictive modeling. Future actual power versus future predicted power 500 is shown. Power usage for one or more data racks, also called information technology (IT) racks, is predicted for a given period time. In the graph 500, three times are shown, T1 520, T2 522, and T3 524. At each time, T1, T2, and T3, predicted power usage is determined for a future period of time. The dots plotted at each time can show the predicted power consumption by individual racks for which power consumption is predicted. A nominal predicted power consumption per IT rack can be a value such as 3000 W (watts) 510. Based on the predicted power, actual power usage can be measured, again based on a nominal power consumption such as 3000 W 512. Machine learning can be performed to determine the power correlation model. Various techniques can be used for the machine learning including artificial neural networks, deep learning, support vector machines (SVM), Bayesian networks, and so on. Other techniques can include using quantile regression, where the quantile regression can be used to supplement heuristics for power prediction. The determining can be for a 99% power consumption value 530. A 99% power consumption value can indicate that 99% or more of the power required at a future time was successfully predicted.

Figure 6:
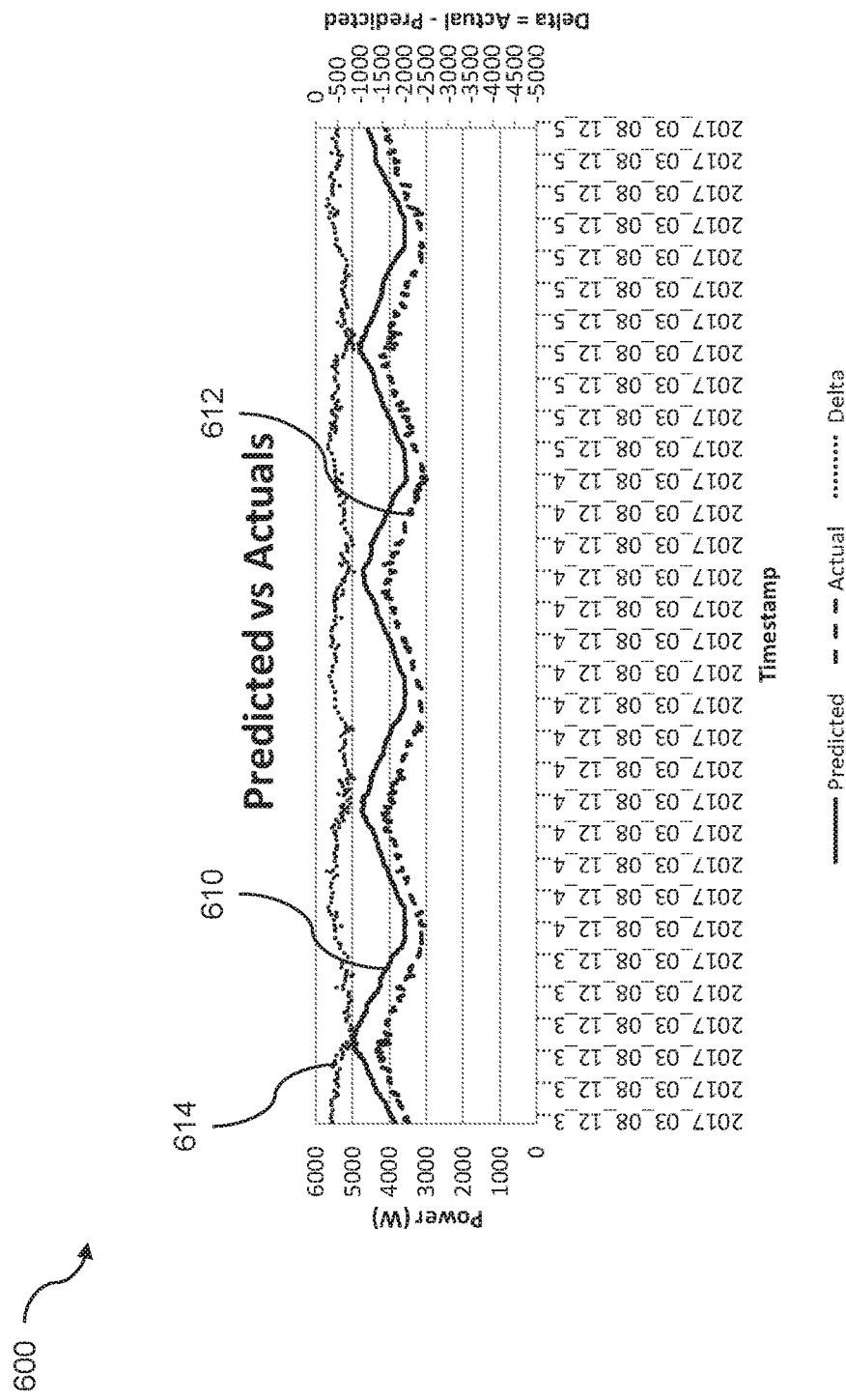
FIG. 6 shows machine learning analysis.

FIG. 6 shows machine learning analysis. Learning can be performed to determine a power correlation model, where a power correlation model can correlate a power prediction to an actual power usage. The actual power usage can include a power usage by a first data rack within a datacenter. The power usage can be over a period of time. The machine learning analysis can be applied to augmented power control within a datacenter using predictive modeling. Learning can be performed to determine the power correlation model and other models. The learning can be based on machine learning, where the machine learning can include a variety of techniques including artificial neural networks, deep learning, support vector machines (SVM), Bayesian networks, and so on. The machine learning can be used for prediction of power load per data rack, per information technology (IT) rack, and so on, for a configurable period of time. The configurable period of time can include 10 seconds, 20 seconds, less than a minute, and so on. The learning period can also be configurable. Power usage predictions can be aggregated by data rack row, or at a container level. The machine learning can be used to support higher electrical equipment availability, higher power efficiency, improved available power capacity, and better power load predictions.

The learning, which can include machine learning, can be based on a variety of heuristics and techniques including quantile regression. The machine learning can be used to refine predicted power usage. Performing quantile regression can be part of the determining the refined power usage prediction. In embodiments, the determining can be for a 99% power consumption value. The quantile regression can be supplemented with heuristics that can be applied to power prediction, such as heuristics based on Markov models. The heuristics can be used to predict power usage patterns and for model calibration. In embodiments, the refining can include adding a power buffer margin calibrated over time. The power buffer margin can be applied to a rack in a datacenter. In embodiments, the power buffer margin can be used in a first power rack that was part of measuring the power usage. The power buffer margin can be applied to other racks in the datacenter. In embodiments, the power buffer margin can be used for a second power rack. The power buffer margin can be calibrated over time. Peak power usage patterns can also be identified. The machine learning can learn repeating seasonal curves such as daily power usage spikes, weekly power usage spikes, etc.

Performance statistics for machine learning analysis 600 are shown for analysis with a 5% configured buffer. Total predicted power 610 can be compared to total actual power 612. A difference or delta 614 between actual power and predicted power can be plotted. Statistics relating to differences between actual power and predicted power can be collected. The statistics can be used for refining the predicted power usage model to improve predicted power usage. The summary of statics can be used to improve other predictive models, etc. The statistics can include a percentage of actual power requirements greater than predicted power requirements, average breach size, minimum and maximum deviation, average deviation, and so on. The predictive modeling such as predicted power usage modeling can be based on a quadratic regression model. A quadratic regression model can include a variety of features. In embodiments, the features can include power, future predicted power, and so on. The power and future predicted power can be plotted, such as a plot at an average slope. The plot can show a prediction for each value of power and future predicted power based on the two predictors. Actual power measurements also can be plotted, as can predicted power values. In embodiments, learning can be performed to determine the power correlation model. A refined power usage prediction can be made based on accuracy metrics.

Figure 7:
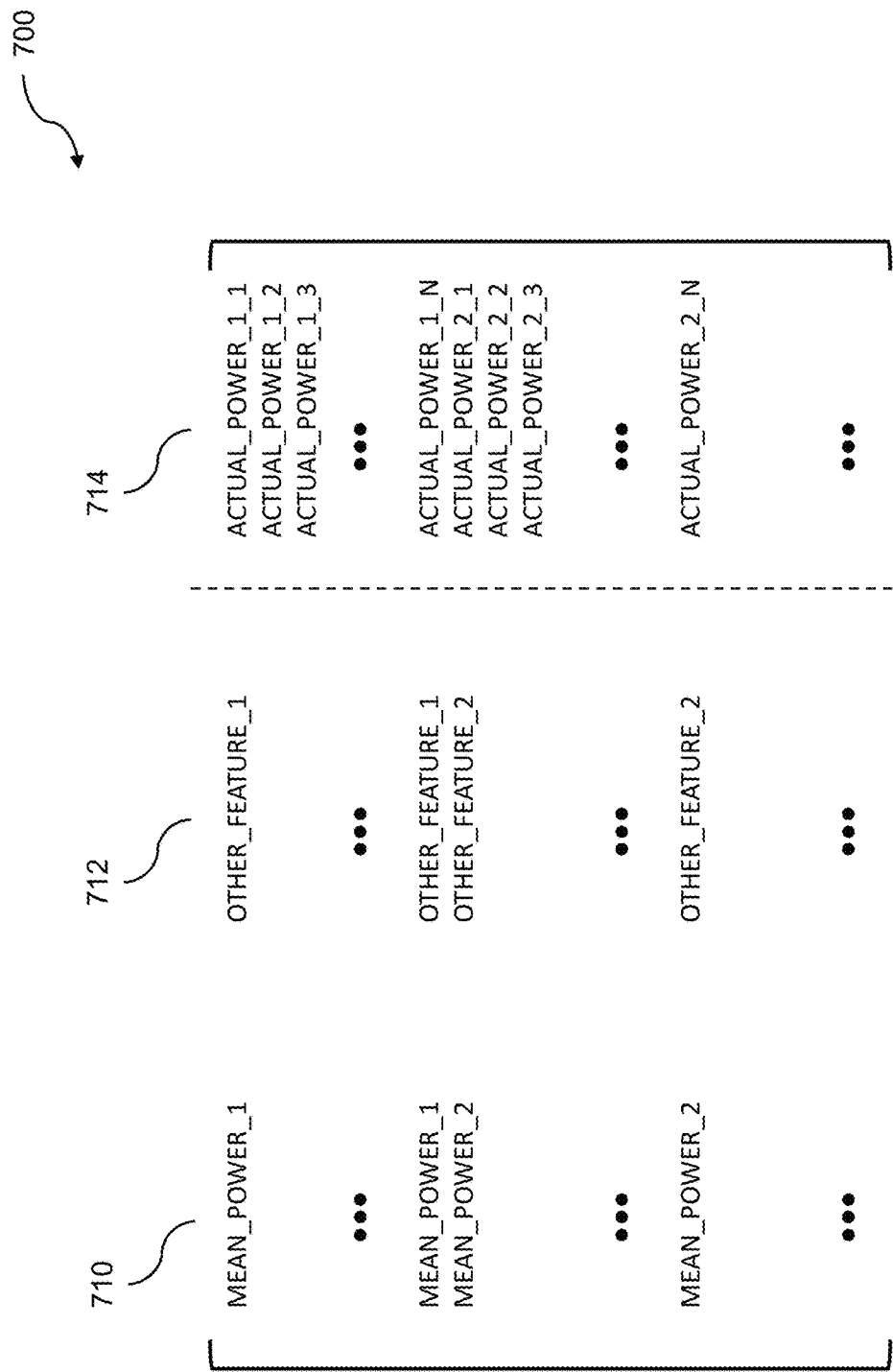
FIG. 7 shows a feature matrix.

FIG. 7 shows a feature matrix. A feature matrix can include a plurality of features and parameters that can be used to describe a set of power requirements within a data center. The feature matrix can support augmented power control within a datacenter using predictive modeling. A feature matrix 700 can include a column mean power 710. Mean power can include mean power combinations of future power needs. Mean power predictions can be determined based on predictive modeling. The power prediction can include a prediction model, where the power prediction model includes predicted power usage and a power correlation model. The feature matrix 700 can include a column of other features 712. Other features can include independent variables such as power spike history, seasonality factors such as monthly job loads, power outages, and so on. The feature matrix 700 can include a column of actual power 714. Actual power can include the measured power requirements of electrical equipment in a given rack or racks in a datacenter. The racks in the datacenter can include data racks, information technology (IT) racks, and so on. The actual power can be used in predictive models, where the predictive models can include power correlation models. In embodiments, the power correlation model can include coefficients, tree logic, or algorithm logic based on historical experience with predicted power usage and actual power usage within the datacenter. The historical experience data can include data from the data center, data from another datacenter, averaged data from a plurality of datacenters, and so on. The historical experience data can include data collected over various amounts of time. The amounts of time can include hours, days, weeks, months, years, and so on.

Figure 8:
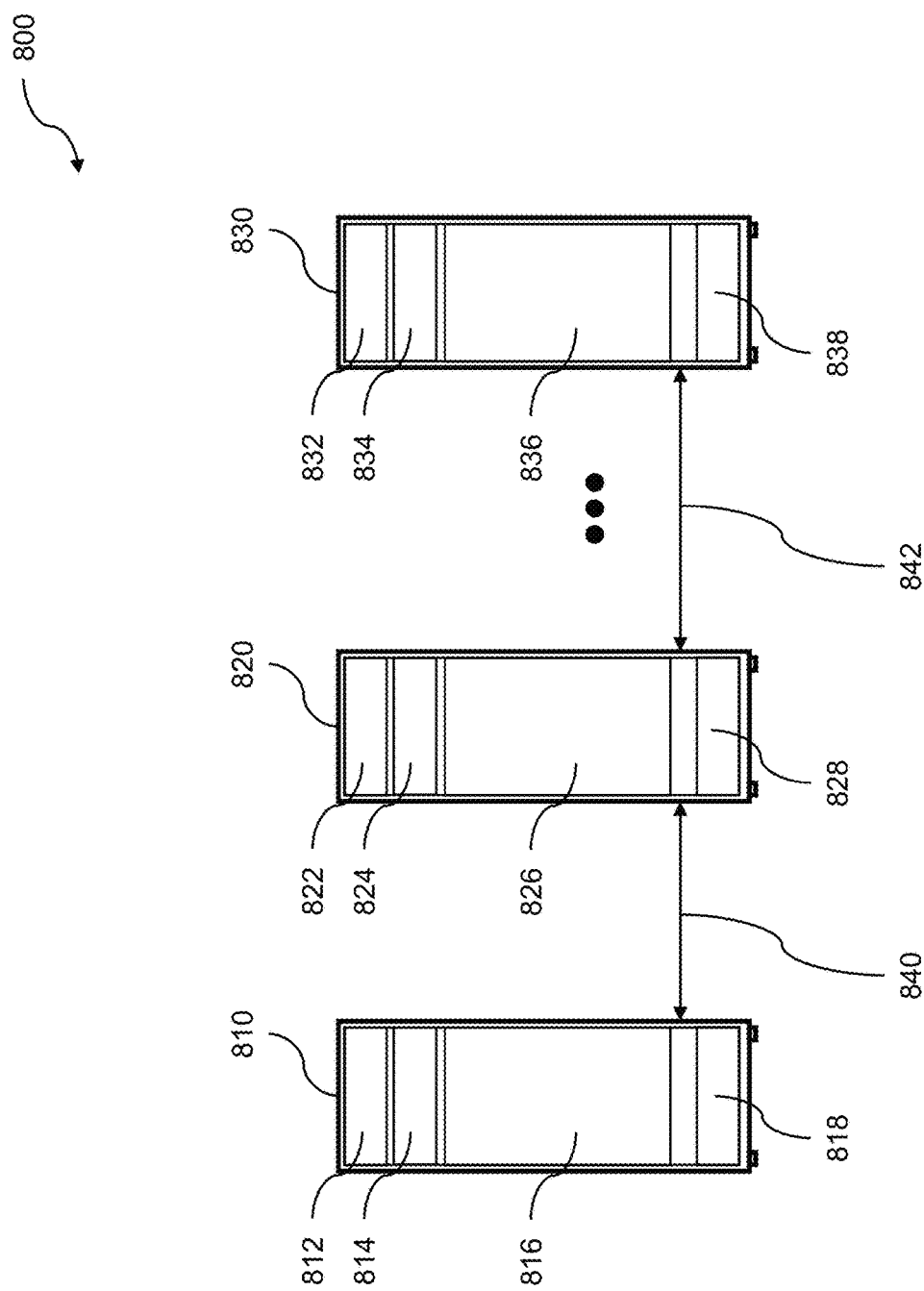
FIG. 8 illustrates data racks in a datacenter.

FIG. 8 illustrates data racks in a datacenter. Data racks, also called information technology racks, contain a variety of electrical equipment for which power is controlled. Augmented power control within a datacenter uses predictive modeling. A power structure within a datacenter can be configured based on a prediction of power requirements. The predicted power requirements can be calculated based on a prediction model. The prediction model can be refined by comparing predicted power requirements with measured power usage. A data center can include multiple data racks. Example 800 includes three data racks, indicated as rack 810, rack 820, and rack 830. While three data racks are shown in example 800, in practice, there can be more or fewer data racks. The data rack 810 includes a power cache 812, a server 814, a server 816, and a power supply 818. The power supply 818 can be used for AC-DC conversion and/or filtering of power to be used by the servers 814 and 816, as well as replenishment of the power cache 812. In embodiments, the power cache 812 includes an array of rechargeable batteries. In embodiments, the batteries include, but are not limited to, lead-acid, nickel metal hydride (NiMH), lithium ion (Li-ion), nickel cadmium (NiCd), and/or lithium ion polymer (Li-ion polymer) batteries. Similarly, the data rack 820 includes a power cache 822, a server 824, a server 826, and a power supply 828. Furthermore, the data rack 830 includes a power cache 832, a server 834, a server 836, and a power supply 838. The data racks are interconnected by communication links 840 and 842. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 800, a power cache can be on each of the multiple data racks within the data center. In embodiments, the power cache includes multiple batteries spread across the multiple data racks.

Figure 9:
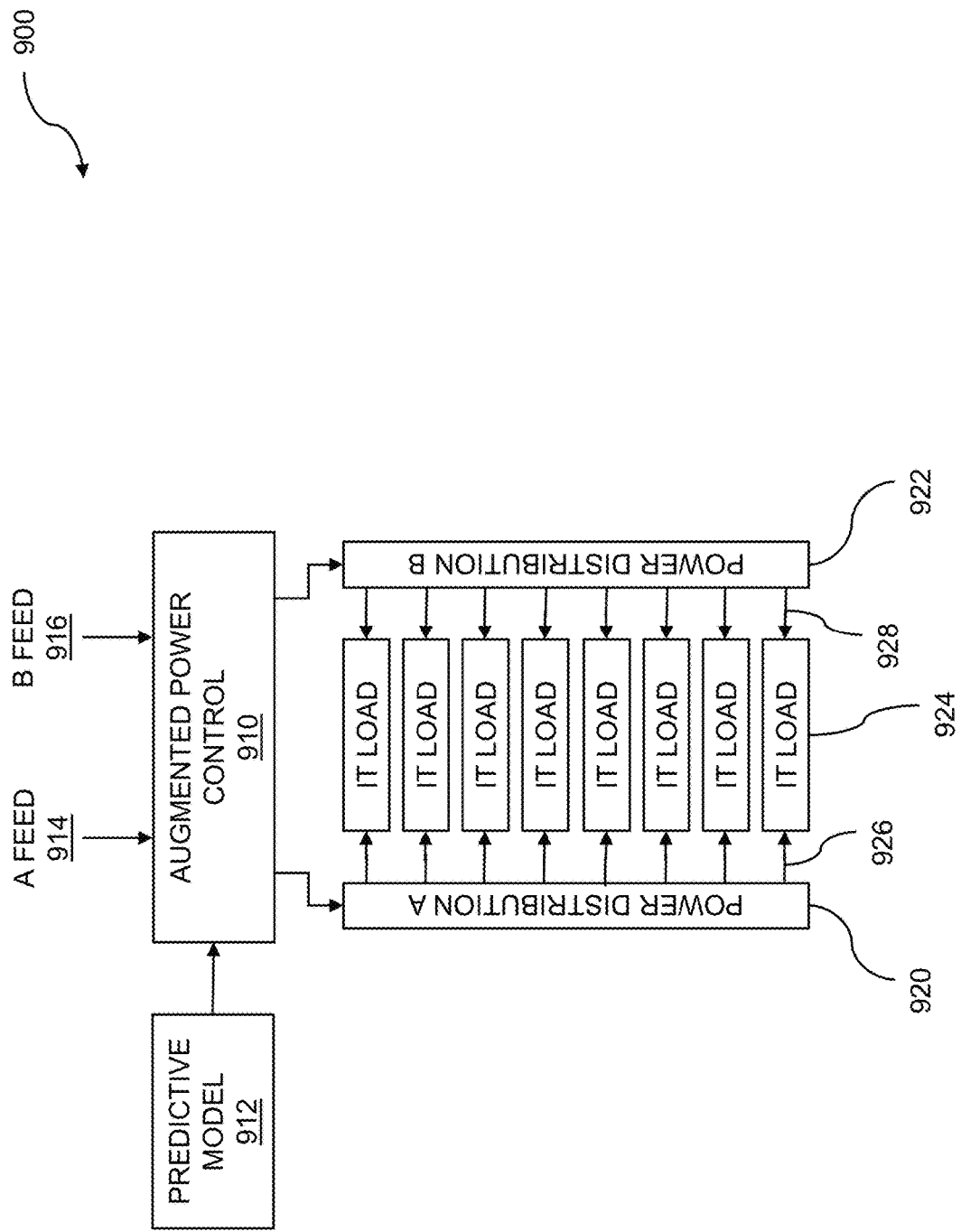
FIG. 9 shows augmented power control using predictive modeling.

FIG. 9 shows augmented power control using predictive modeling. The datacenter can include a plurality of data racks, also called information technology (IT) racks, in which a plurality of IT equipment and other electrical equipment can be placed. The IT equipment can include devices such as servers, blade servers, communications switches, backup data storage units, communications hardware, and other devices. The electrical equipment can include one or more of processors, data servers, server racks, heating, ventilating, air conditioning (HVAC) units, uninterruptable power supplies (UPS), backup power, and so on. The power that is provided to the IT equipment and other electrical equipment can be controlled, where the control can be based on the availability of power, power policies for the datacenter, contractual agreements, so on. Control of the IT equipment and electrical equipment can be augmented based on predictive models for power usage.

An example configuration for power control is shown 900. Augmented power control can be used to control the configuration of a datacenter power structure. Configuration of the datacenter power structure includes distributing power such as grid power, locally generated power, and so on, to information technology (IT) loads. The IT loads can be located in data racks and IT racks throughout the datacenter. The augmented power control can be based on a predictive model 912. The predictive model can include a power prediction model, where the power prediction model can include predicted power usage and a power correlation model. The power prediction model can be used to predict power usage requirements by the IT and electrical equipment at a time subsequent to the time when the prediction model was calculated. The power prediction model can be updated, changed, replaced, refined, and so on, by correlating predicted power usage with measured power usage. Power including an A feed 914 and a B feed 916 can be controlled by augmented power control 910. The power from the A feed and from the B feed can include grid power, locally generated power, battery power, backup power, and so on.

The power from the augmented power control can be distributed to IT equipment throughout a datacenter. The IT equipment includes IT loads 924. The power, augmented power, backup power, and so on, can be distributed to the IT equipment through a power distribution unit (PDU) or using another power distribution technique. Two power distribution units are shown, power distribution A 920 and power distribution B 922. The power distribution units A and B can selectively distribute power to the IT equipment. Whether power is distributed from a feed to an IT load can be selectively controlled by the augmented power control. Power is distributed to the IT loads via a plurality of power connections. Power is distributed to the IT loads from feed A via power connections 926, and power is distributed to the IT loads from feed B via power connections 928. The IT loads can be powered by power distribution A, power distribution B, or both power distribution A and power distribution B.

Figure 10:
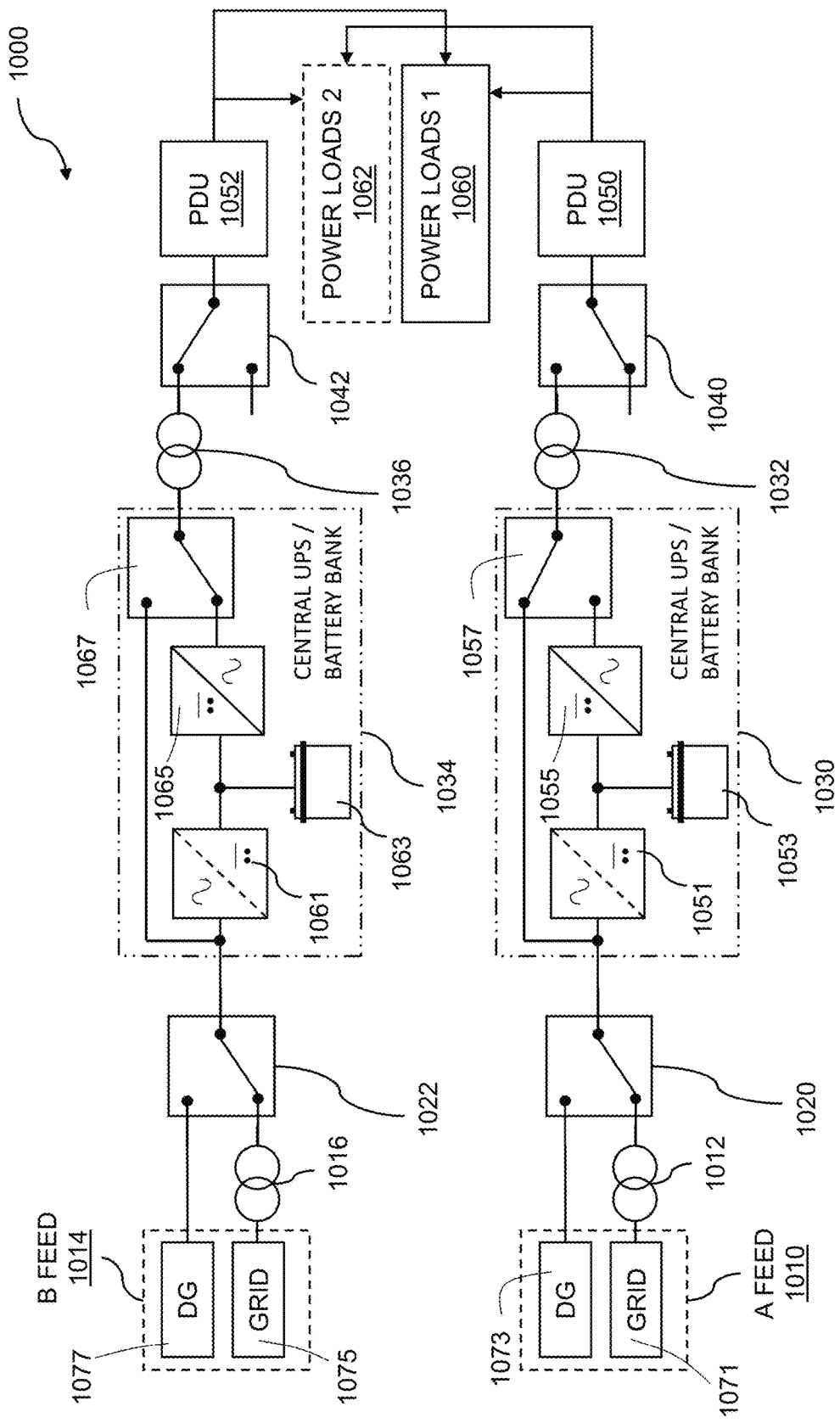
FIG. 10 shows a topology representation with multiple sets.

FIG. 10 shows a topology representation with multiple sets. Multiple sets can be both controlled and arranged in a variety of topologies for providing power to a datacenter. Augmented power control within a datacenter uses predictive modeling, where the predictive modeling uses a power correlation model. The power correlation model can be refined by correlating predicted power usage with measured power usage. The topology representation 1000 includes a first main power source 1010, referred to as the "A feed." The topology representation 1000 further includes a second main power source 1014, referred to as the "B feed." Each feed is capable of powering each device in the datacenter simultaneously. This configuration is referred to as 2N redundancy for power. The A feed 1010 includes a grid source 1071, and a secondary, local source of a diesel generator (DG) 1073. The grid source 1071 is input to a power regulator 1012 and then into one input of a switch block 1020. The diesel generator 1073 is connected to a second input of the switch block 1020. The switch block 1020 can be configured to select the diesel generator source or the grid source by arrangement of a power policy. The switch block 1020 feeds into an uninterruptable power supply (UPS) 1030. The UPS 1030 includes an AC-DC converter 1051 configured to charge a power cache 1053. In embodiments, the power cache 1053 is a battery. The UPS 1030 further includes a DC-AC converter 1055 that feeds into an input of a switch block 1057. The output of the switch block 1020 feeds into a second input of the switch block 1057. The output of the UPS 1030 is input to a power regulator 1032, and then to an input of a switch block 1040. The switch block 1057 can be configured, based on a power policy, to provide power from the power cache, or bypass the power cache and provide power directly from the local or grid power source. The second input of the switch block 1040 is not connected, such that if the second input is selected, the A feed 1010 is disconnected from the PDU 1050. The PDU (Power Distribution Unit) distributes power within a datacenter and feeds the power loads 1060 within the datacenter.

Similarly, the B feed 1014 includes a grid source 1075, and a secondary, local source of a diesel generator (DG) 1077. The grid source 1075 is input to a power regulator 1016 and then into one input of a switch block 1022. The diesel generator 1077 is input to a second input of the switch block 1022. The switch block 1022 can be configured, based on a power policy, to select the diesel generator source or the grid source. The switch block 1022 feeds into a UPS 1034. The UPS 1034 includes an AC-DC converter 1061 configured to a charge power cache 1063. In embodiments, power cache 1063 may be a battery. The UPS 1034 further includes a DC-AC converter 1065 that feeds into an input of a switch block 1067. The output of the switch block 1022 feeds into a second input of a switch block 1067. The switch block 1067 can be configured, based on a power policy, to provide power from the power cache, or bypass the power cache and provide power directly from the local or grid power source. The output of the UPS 1034 is input to a power regulator 1036, and then to an input of a switch block 1042. The second input of the switch block 1042 is not connected, such that if the second input is selected, the B feed 1014 is disconnected from the PDU 1052, which in turn feeds the first set of power loads 1060 and/or the second set of power loads 1062 within the datacenter. A controller controls the PDU 1052. The controller can receive a power policy for use in the datacenter. Thus, the A feed 1010 and the B feed 1014 comprise a first main power source and a second main power source. The power source and the second power source can provide 2N redundancy to the power load. Furthermore, in embodiments, the power source and a second power source share power to the multiple data racks, wherein the power is shared on a fractional basis. A variety of dynamic power scenarios can be simulated based on the topology shown in FIG. 10.

Figure 11:
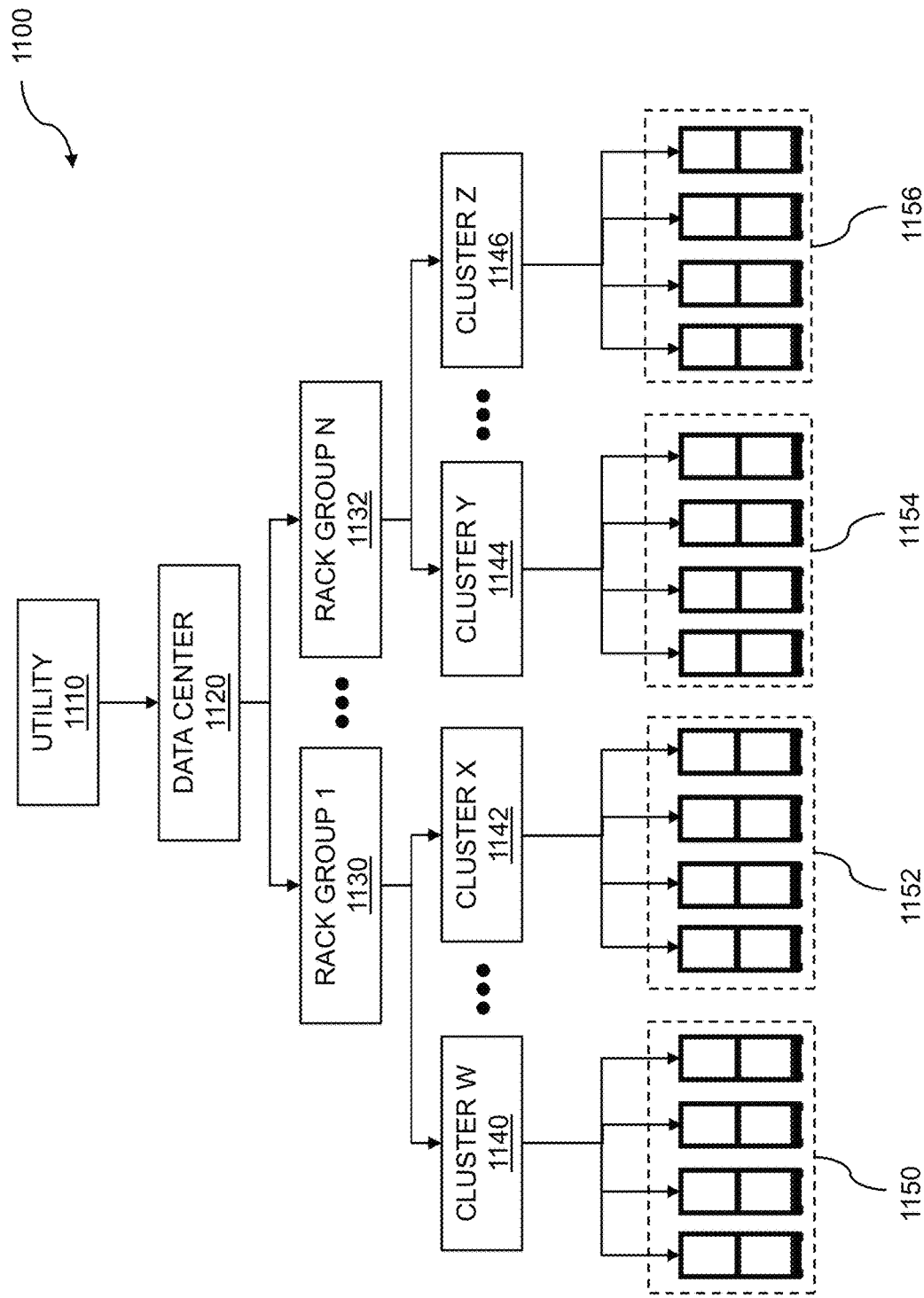
FIG. 11 illustrates hierarchical allocation of power control.

FIG. 11 illustrates hierarchical allocation of power control. Power control can include augmented power control within a datacenter. The augmented power control uses predictive modeling, where the predictive modeling can be based on a power correlation model that correlates a power prediction to an actual power usage. The predictive model can be updated based on refining the power correlation model. The example 1100 includes a utility 1110 as the top level of the hierarchy. The utility can include a local or regional energy provider. The example 1100 further includes a data center 1120 that receives power from the utility 1110. Within the data center 1120, the next downstream level of the hierarchy is the group level. The group level includes multiple groups, indicated as rack group 1 1130 and rack group N 1132. Each group can have a group policy. The group policy can include a hierarchical set of policies. Within the groups, the next downstream level of the hierarchy is the cluster level. The rack group 1130 includes multiple clusters, indicated as clusters W 1140 and X 1142. The group 1132 includes multiple clusters, indicated as clusters Y 1144 and Z 1146. Thus, in embodiments, the data center comprises a plurality of clusters of data racks. Each cluster includes multiple data racks. The cluster 1140 includes the data racks 1150. The cluster 1142 includes the data racks 1152. The cluster 1144 includes the data racks 1154. The cluster 1146 includes the data racks 1156. Thus, the data center can include a plurality of clusters of data racks. In embodiments, the power cache comprises multiple batteries spread across the multiple data racks. Embodiments include dynamically allocating power from the power source across the plurality of data racks.

During operation of the system, power policies are propagated downstream from the data center 1120 to the group level, and from the group level to the cluster level, and from the cluster level to the data rack level. The data center comprises multiple data racks. Operating conditions and/or power requirements are sent upstream. Thus, each data rack reports operating information to a cluster controller within its corresponding cluster. Each cluster reports operating information to a group controller within its corresponding group. Each group reports operating information to a data center controller. In this way, information, status, and operating conditions can quickly propagate through the system to allow power policies to act on the reported information in a timely manner. The datacenter configuration is based on the refined power usage prediction. Learning is performed to determine the power correlation model.

Figure 12:
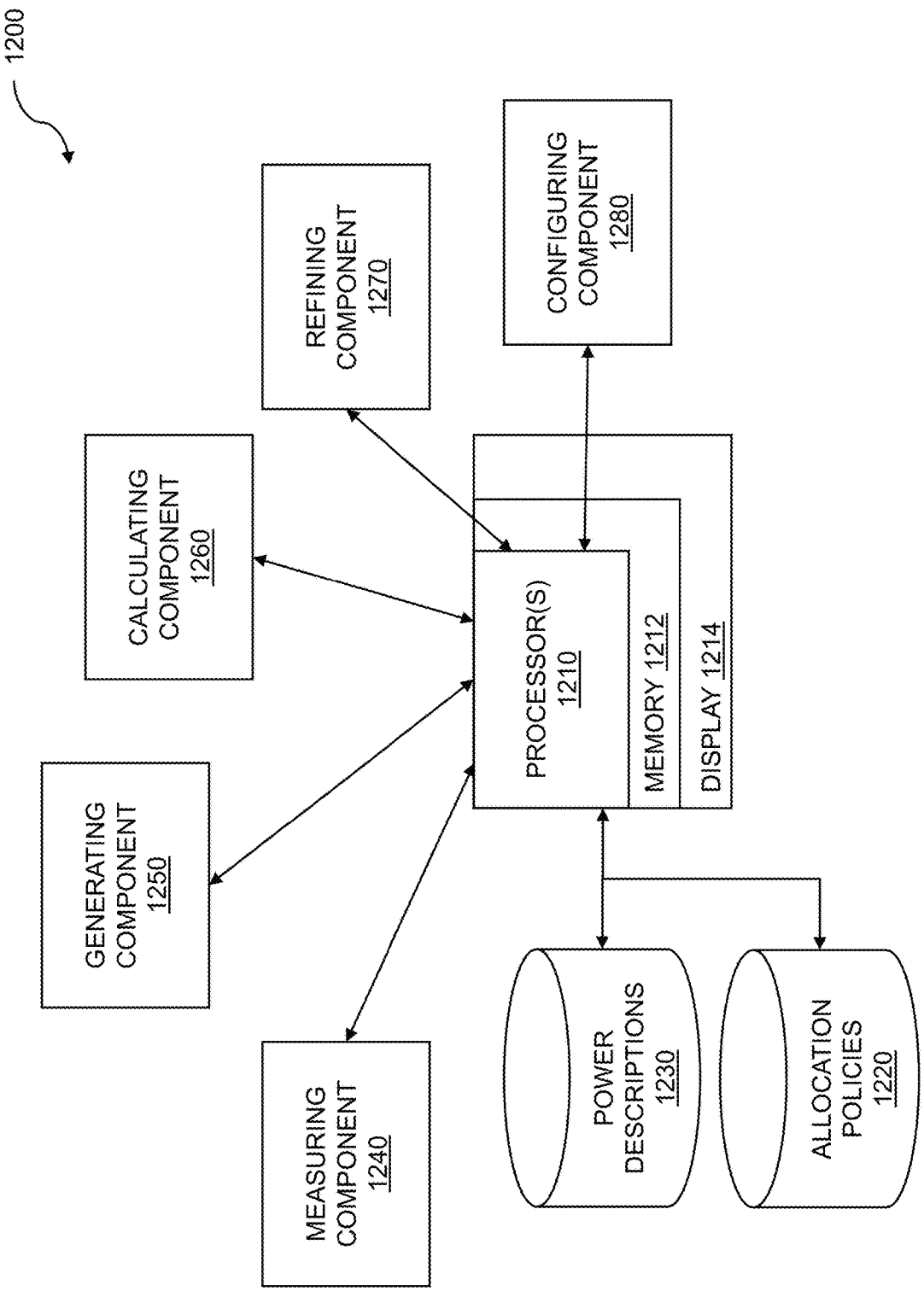
FIG. 12 shows a system diagram for augmented power control within a datacenter using predictive modeling.

FIG. 12 shows a system diagram for augmented power control within a datacenter using predictive modeling. Power management within a datacenter configures the datacenter power structure using predictive modeling. A predictive model for power usage is refined based on measuring power usage and calculating a correlation between a power prediction and the actual power usage. The system 1200 can include one or more processors 1210 and a memory 1212 which stores instructions. The memory 1212 is coupled to the one or more processors 1210, wherein the one or more processors 1210 can execute instructions stored in the memory 1212. The memory 1212 can be used for storing instructions, for storing databases of power sources, power caches, and power loads, for storing information pertaining to load requirements or redundancy requirements, for storing power policies, for system support, for intermediate results such as correlation values, and the like. Information about augmented power control within a datacenter using predictive modeling can be shown on a display 1214 connected to the one or more processors 1210. The display can comprise a television monitor, a projector, a computer monitor (including a laptop screen, a tablet screen, a netbook screen, and the like), a smartphone display, a personal digital assistant (PDA) display, a mobile device, or another electronic display.

The system 1200 includes allocation policies 1220. In embodiments, the allocation policies 1220 are stored in a networked database, such as a structured query language (SQL) database. The allocation policies 1220 can include limits, such as power consumption limits, as well as switch configurations that can occur when certain conditions are met. For example, when conditions allow peak shaving to take place, and surplus power exists, the power policies can identify switches and their configurations to allow replenishing of the power caches. The system 1200 further includes a repository of power descriptions 1230. The power descriptions 1230 can include, but are not limited to, power descriptions of power loads, power caches, power supplies, rack power profiles, batteries, buses, circuit breakers, fuses, and the like. The system 1200 can include a measuring component 1240. The measuring component 1240 can use one or more processors and can be used to measure power usage of a first data rack, a first information technology rack, and so on. The measuring of the power usage of the first data rack can be over a first period of time, a predetermined time period, a randomly chosen time period, etc. The first period of time can comprise a fixed number of seconds such as 10 seconds, 20 seconds, and so on. The first period of time can be less than a minute.

The system 1200 includes a generating component 1250. The generating component 1250 can use a computing device and can be configured to generate a predicted power usage by the first data rack over a second period of time. The second period of time can be subsequent to the first period of time. The second period of time can be an amount of time equal to the first period of time or a different amount of time. The system 1200 includes a calculating component 1260. The calculating component 1260 can use the computing device and can be configured to calculate a power correlation model that correlates a power prediction to an actual power usage. The power correlation model can include coefficients, tree logic, or algorithm logic based on historical experience with predicted power usage and actual power usage within the datacenter. The historical experience can be over a period of time such as hours, days, weeks, months, years, and so on. The historical experience can relate to the datacenter, to another datacenter, to an average of historical experiences collected from a plurality of datacenters, and so on.

The system 1200 includes a refining component 1270. The refining component 1270 can use the computing device and can refine the predicted power usage for the second period of time. The refining can be based on the predicted power usage and the power correlation model. Configuration of a datacenter power can be based on using the refined power usage prediction. In embodiments, the refining can be accomplished using a power prediction model comprising the predicted power usage and the power correlation model. The refining can be based comparing the success of the calculated power correlation model with the measured power usage. In embodiments, the refining can further include updating the power prediction model based on the refining. The system 1200 includes a configuring component 1280. The configuring component can use the one or more processors and can configure datacenter power structure, based on the refined power usage prediction. Configuring datacenter power structure can include configuring power supplies, power caches which can include batteries, uninterruptable power supplies (UPS), power switches, and so on. The configuring datacenter power structure can include configuring power within data racks and information technology (IT) racks, rows of data racks, clusters of data and IT racks, etc. The configuring datacenter power structure can be used for implementing dynamic redundancy within the datacenter. Dynamic redundancy can include providing redundant power to data racks and IT racks, such as 2N redundancy of power, for a given period of time.

Disclosed embodiments can include a computer program product embodied in a non-transitory computer readable medium for power management, the computer program product comprising code which causes one or more processors to perform operations of: measuring a power usage by a first data rack within a datacenter over a first period of time; generating a predicted power usage by the first data rack over a second period of time, wherein the second period of time is subsequent to the first period of time; calculating a power correlation model that correlates a power prediction to an actual power usage; refining the predicted power usage for the second period of time, based on the predicted power usage and the power correlation model; and configuring datacenter power structure, based on the refined power usage prediction.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for power management comprising:

measuring, using one or more processors, a power usage by a first data rack within a datacenter over a first period of time;

generating, on a computing device, a predicted power usage by the first data rack over a second period of time, wherein the second period of time is subsequent to the first period of time;

calculating, on the computing device using a neural network, a power correlation model that correlates a power prediction to an actual power usage for the datacenter;

refining, on the computing device, the predicted power usage for the second period of time, based on the predicted power usage and the power correlation model resulting in a refined power usage prediction, wherein the refining includes adjusting at least one coefficient or weight in the power correlation model and wherein the refining includes adding a power buffer margin calibrated over time; and configuring, using the one or more processors, a power structure for the datacenter, based on the refined power usage prediction.

2. The method of claim 1 wherein the refining is accomplished using a power prediction model comprising the predicted power usage and the power correlation model.

3. The method of claim 2 wherein the refining further comprises updating the power prediction model based on the refining.

4. The method of claim 1 further comprising refining predicted power usage for a third period of time wherein the third period of time is subsequent to the second period of time and wherein the refining is based on the power correlation model.

5. The method of claim 1 wherein the power buffer margin is used in a first power rack that was part of the measuring the power usage.

6. The method of claim 1 wherein the configuring is used for implementing dynamic redundancy within the datacenter.

7. The method of claim 6 wherein the implementing dynamic redundancy is accomplished using a policy for a power switch within the datacenter based on the refined power usage prediction.

8. The method of claim 7 wherein the dynamic redundancy comprises providing redundant power to data racks within the datacenter for a given period of time.

9. The method of claim 1 further comprising measuring a power usage by a second data rack within the datacenter over the first period of time.

10. The method of claim 9 further comprising aggregating the power usage by a first data rack with the power usage by a second data rack over the first period of time.

11. The method of claim 9 further comprising measuring power usage by further data racks within the datacenter over the first period of time.

12. The method of claim 11 further comprising aggregating the power usage by further data racks with the power usage by a first data rack.

13. The method of claim 12 further comprising generating a predicted power usage for the datacenter over the second period of time based on the power usage, by a first data rack and the further data racks, that was aggregated.

14. The method of claim 13 further comprising determining an aggregated refined power usage prediction for the datacenter based on the predicted power usage that was aggregated and the power correlation model.

15. The method of claim 1 wherein the power correlation model comprises coefficients, tree logic, or algorithm logic based on historical experience with predicted power usage and actual power usage within the datacenter.

16. The method of claim 1 further comprising identifying peak power patterns and further refining the refined power usage prediction based on the peak power patterns.

17. The method of claim 1 further comprising determining metrics for accuracy of the refined power usage prediction.

18. The method of claim 17 further comprising determining a permissible accuracy associated with the metrics for accuracy on the refined power usage prediction.

19. The method of claim 1 further comprising performing learning to determine the power correlation model.

20. The method of claim 1 wherein the predicted power usage is based on applications running on the first data rack.

21. The method of claim 1 wherein the first period of time and the second period of time are for a granular period of time.

22. The method of claim 21 wherein the granular period of time includes a sampling rate and a sample duration to measure power usage.

23. The method of claim 1 further comprising altering a datacenter configuration based on the refined power usage prediction.

24. The method of claim 1 wherein the one or more processors are on the computing device.

25. The method of claim 1 further comprising performing quantile regression as part of the refining the predicted power usage.

26. The method of claim 25 wherein the quantile regression is accomplished using Markov models.

27. The method of claim 1 further comprising identifying a spike in power usage and refining the predicted power usage based on the spike in power usage.

28. The method of claim 1 wherein predictive modeling is used to refine the predicted power usage based on a quadratic regression model.

29. A computer program product embodied in a non-transitory computer readable medium for power management, the computer program product comprising code which causes one or more processors to perform operations of:

measuring a power usage by a first data rack within a datacenter over a first period of time;

generating a predicted power usage by the first data rack over a second period of time, wherein the second period of time is subsequent to the first period of time;

calculating, using a neural network, a power correlation model that correlates a power prediction to an actual power usage for the datacenter;

refining the predicted power usage for the second period of time, based on the predicted power usage and the power correlation model resulting in a refined power usage prediction, wherein the refining includes adjusting at least one coefficient or weight in the power correlation model and wherein the refining includes adding a power buffer margin calibrated over time; and configuring a power structure for the datacenter, based on the refined power usage prediction.

30. A computer system for power management comprising:

a memory which stores instructions;

one or more processors attached to the memory wherein the one or more processors, when executing the instructions which are stored, are configured to:

measure, using the one or more processors, a power usage by a first data rack within a datacenter over a first period of time;

generate, on a computing device, a predicted power usage by the first data rack over a second period of time, wherein the second period of time is subsequent to the first period of time;

calculate, on the computing device using a neural network, a power correlation model that correlates a power prediction to an actual power usage for the datacenter;

refine, on the computing device, the predicted power usage for the second period of time, based on the predicted power usage and the power correlation model resulting in a refined power usage prediction, wherein refining the predicted power usage includes adjusting at least one coefficient or weight in the power correlation model and wherein the refining includes adding a power buffer margin calibrated over time; and configure, using the one or more processors, a power structure for the datacenter, based on refined power usage prediction.

\* \* \* \* \*